United States Patent
Kumar et al.

(10) Patent No.: US 10,625,590 B1
(45) Date of Patent: Apr. 21, 2020

(54) INTEGRATED MOUNTING STRUCTURE FOR AN ENGINE

(71) Applicant: Caterpillar Inc., Deerfield, IL (US)

(72) Inventors: Samuel Shanti Kumar, Dunlap, IL (US); Eric LaVere Abernathy, Cuba, IL (US); Derek Paul Grove, Varna, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/259,535

(22) Filed: Jan. 28, 2019

(51) Int. Cl.
*B60K 5/12* (2006.01)

(52) U.S. Cl.
CPC ......... *B60K 5/1216* (2013.01); *B60Y 2306/05* (2013.01)

(58) Field of Classification Search
CPC ......... B60K 5/1216; B60K 5/12; F02B 67/06; F02B 67/04; F02B 67/00
See application file for complete search history.

(56) References Cited

U.S. PATENT DOCUMENTS

| | | | |
|---|---|---|---|
| 5,216,984 A * | 6/1993 | Shimano | F01L 1/02 123/195 R |
| 5,718,196 A * | 2/1998 | Uchiyama | F01L 1/265 123/195 C |
| 6,098,950 A * | 8/2000 | Zupan | F02B 67/00 123/195 A |
| 7,034,410 B2 | 4/2006 | Kennedy | |
| 7,562,905 B2 | 7/2009 | Ruste | |
| 7,971,887 B2 | 7/2011 | Dorr et al. | |
| 8,601,997 B2 * | 12/2013 | Cockerill | F01M 5/002 123/195 A |
| 8,794,209 B2 | 8/2014 | Klika et al. | |
| 9,765,683 B2 * | 9/2017 | Lazich | F01P 5/10 |
| 2001/0023668 A1 * | 9/2001 | Guzman | F01P 11/00 123/41.44 |
| 2007/0251751 A1 | 11/2007 | Ball et al. | |
| 2013/0125856 A1 * | 5/2013 | Itakura | F01P 5/10 123/198 R |
| 2014/0329630 A1 * | 11/2014 | Williams | F02B 67/06 474/150 |

FOREIGN PATENT DOCUMENTS

| | | |
|---|---|---|
| CN | 201170163 Y | 12/2008 |
| CN | 102954875 A | 3/2013 |
| CN | 203623898 U | 6/2014 |
| CN | 205059140 U | 3/2016 |

* cited by examiner

*Primary Examiner* — John D Walters
*Assistant Examiner* — James J Triggs
(74) *Attorney, Agent, or Firm* — Law Office of Kurt J. Fugman LLC

(57) ABSTRACT

A mounting bracket includes a single unitary sheet of material, and a top portion including a first cradle including a first concave surface defining a first radius of curvature and a first longitudinal axis, and a second cradle including a second concave surface defining a second radius of curvature that is different than the first radius of curvature and a second longitudinal axis that is parallel to the first longitudinal axis. A first pair of mounting surfaces may straddle either side of the first cradle, and a second pair of mounting surfaces may straddle either side of the second cradle.

20 Claims, 2 Drawing Sheets

INTEGRATED MOUNTING STRUCTURE FOR AN ENGINE

TECHNICAL FIELD

The present disclosure relates to a mounting structure for installing components and systems to an engine. Specifically, the present disclosure relates to such a mounting structure that facilitates the service of various components and systems of an engine while also keeping the operating parameters of these various components and systems within desired operating ranges.

BACKGROUND

Internal combustion engines are often used in earth moving, construction and mining equipment and the like. In a conventional engine configuration, a plurality of components such as fuel filter, oil filter, fuel pump timing adjustment cover, water lines, ATAAC (air to air after cooler) lines etc. are mounted on the engine. More particularly, an alternator is placed near to the exhaust system. As a result, it leads to damage of the alternator at high temperature conditions. Moreover, in many current engine configurations, there is no other space available to mount the alternator.

More particularly, it is often necessary to drive an AC (air conditioner) compressor and alternator by constant belt tension, using power from crankshaft while not exceeding the maximum ambient temperature of 105 degrees centigrade (for the alternator) and still be able to provide mounting for fuel filter, oil filter, fuel pump timing adjustment cover, water lines, and ATAAC lines to the engine. Preferably, these needs should be accomplished without straining the front housing of the engine while also allowing easy servicing of the various components such as the fuel and oil filters, etc.

U.S. Pat. No. 8,794,209 is directed to an engine mounting system for power equipment. The mounting system includes a tubular frame, an internal combustion engine, and or more supports for mounting the engine to the tubular frame. The internal combustion engine includes an engine block and a crankcase cover attached to the engine block. The one or more supports are integrally case with and extend away from at least one of the engine block and the crankcase cover. Additionally, the one or more supports are designed to be mounted to the frame and are contoured to match a portion of a profile of the frame.

However, the engine mounting system of the '209 patent does not address keeping the various components and systems attached to engine operating at desired parameters, while also avoiding straining the front housing of the engine and providing serviceability to the various components and systems of the engine. Accordingly, it is desirable that an engine mounting structure that addresses these needs be developed.

SUMMARY

A mounting structure for an engine assembly according to an embodiment of the present disclosure may be provided. The mounting structure may comprise a mounting bracket comprising a single unitary sheet of material, the mounting bracket including a top portion including a first cradle including a first concave surface defining a first radius of curvature and a first longitudinal axis, and a second cradle including a second concave surface defining a second radius of curvature that is different than the first radius of curvature.

The second concave surface may also define a second longitudinal axis that is parallel to the first longitudinal axis. A first pair of mounting surfaces may straddle either side of the first cradle, and a second pair of mounting surfaces may straddle either side of the second cradle.

An engine assembly according to an embodiment of the present disclosure is provided. The engine assembly may comprise an engine block, and a mounting structure including a mounting bracket comprising a single unitary sheet of material. The mounting bracket may include a top portion including a first cradle including a first concave surface defining a first radius of curvature and a first longitudinal axis, and a second cradle including a second concave surface defining a second radius of curvature that is greater than the first radius of curvature, the second concave surface also defining a second longitudinal axis and including a front portion and a rear portion disposed along the second longitudinal axis. The mounting bracket may also include a projection extending upwardly from the second concave surface disposed proximate the rear portion of the second concave surface. An AC compressor contacts the first cradle, and an alternator may contact the second cradle.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
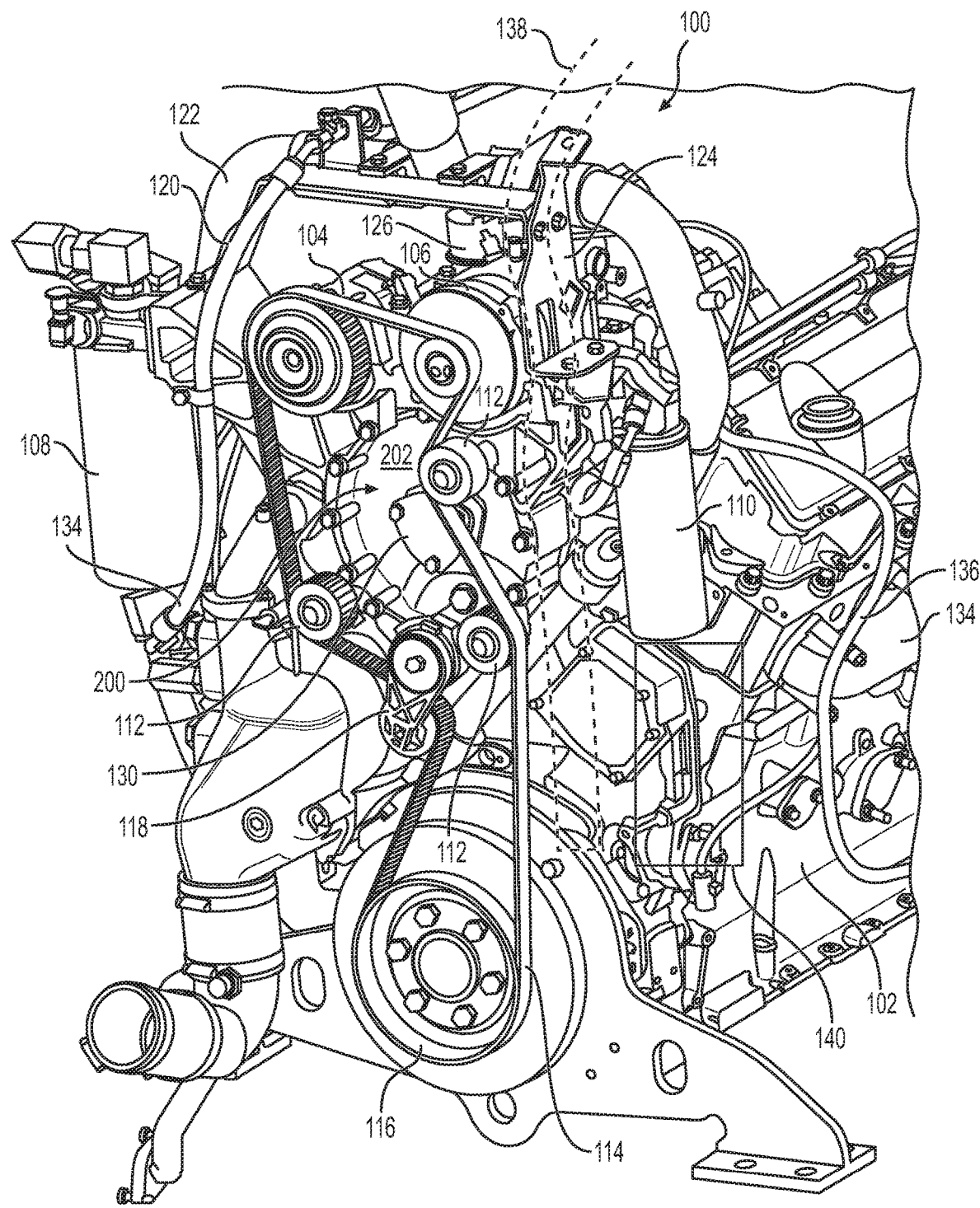
FIG. 1 is a perspective of an engine assembly using an integrated mounting structure according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a one-piece integrated bracket made of aluminum alloy that mounts the AC compressor and alternator on top of the engine will now be discussed. The bracket design helps to ensure that the high exhaust temperatures may not affect the alternator. Moreover, the bracket design may also provide for the mounting for the remaining components and systems of the engine. More particularly, the mounting bracket may be made out of an aluminum alloy that is lighter in weight than previous materials and does not strain the front housing of the engine significantly. Additionally, the mounting bracket may allow the various components and systems of the engine to be mounted and serviced readily.

Looking at FIGS. 1 and 2, an engine assembly 100 that may use a mounting structure 200 according to various embodiments of the present disclosure will now be discussed. The engine assembly 100 may include an engine block 102 and a mounting structure 200 for attaching various components and systems to the engine assembly 100.

Figure 2:
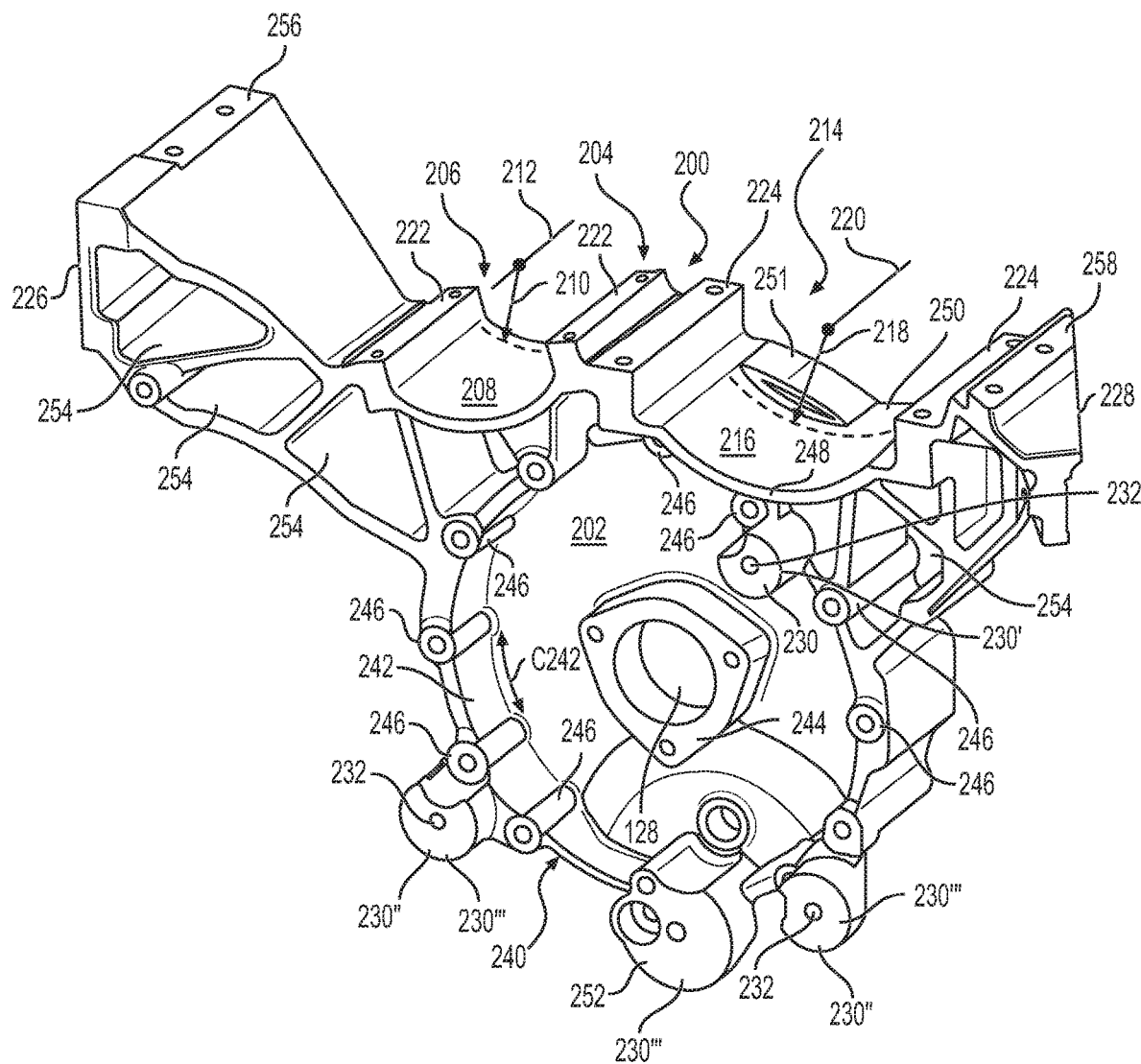
FIG. 2 is a perspective view of the integrated mounting structure of FIG. 1 shown in isolation from the engine.

Focusing on FIG. 2, the mounting structure 200 may comprise a mounting bracket 202 comprising a single unitary sheet of material that is formed by casting, forging, sheet metal fabrication, etc. In particular embodiments, the material may be a cast aluminum but other materials are possible. The mounting bracket 202 may include a top portion 204 that includes a first cradle 206 including a first concave surface 208 defining a first radius of curvature 210 and a first longitudinal axis 212. Likewise, a second cradle 214 including a second concave surface 216 defining a second radius of curvature 218 that is different than the first radius of curvature 210. The second concave surface 216 may also define a second longitudinal axis 220 that is parallel to the first longitudinal axis 212. This may not be the case for other embodiments of the present disclosure.

In addition, a first pair of mounting surfaces 222 may straddle either side of the first cradle 206, and a second pair of mounting surfaces 224 may straddle either side of the second cradle 214. These surfaces may be used to mount an alternator and an air conditioner to the mounting bracket 202 via straps as will be discussed in more detail later herein.

Similarly, the mounting bracket 202 may further comprise a left side attachment surface 226 that is flat and a right side attachment surface 228 that is flat. Other configurations for these surfaces is possible in other embodiments. For the embodiment shown in FIG. 2, the left side attachment surface 226 is not parallel to the right side attachment surface 228. Moreover, the left side attachment surface 226 is parallel to the first longitudinal axis 212 of the first cradle 206 and to the second longitudinal axis 220 of the second cradle 214. As will be discussed in further detail later herein, these attachment surfaces 226, 228 may be used to attach an oil filter assembly and a fuel filter assembly to the mounting bracket 202.

The mounting bracket 202 may further comprise a first plurality of mounting bosses 230 that are configured to allow other components to be attached to the mounting bracket 202 (i.e. that these mounting bosses may be large enough and provide larger support surfaces for these components (e.g. idlers)). Also, each of the first plurality of mounting bosses 230 defines an aperture 232 that is configured to receive a fastener. At least one 230' of the first plurality of mounting bosses 230 may be disposed adjacent and below the second cradle 214. On the other hand, the mounting bracket 202 may include a bottom portion 240 and at least two 230" of the first plurality of mounting bosses 230 may be disposed adjacent the bottom portion 240 of the mounting bracket 202.

The mounting bracket 202 may further comprise an outer annular wall 242 that includes a cylindrical configuration with a circumferential direction C242, and an inner annular wall 244 including a substantially triangular configuration (e.g. a three sided lobed configuration). The inner annular wall 244 may be offset inwardly from the outer annular wall 242. The outer annular wall 242 may be disposed below the first cradle 206 and the second cradle 214 and may further comprise a second plurality of mounting bosses 246 forming a circular array disposed circumferentially on the outer annular wall 242.

Referring now to FIG. 1, the engine assembly 100 in its entirety will now be described. The engine assembly 100 may comprise an engine block 102 and a mounting bracket 202 similar or identical to that previously described herein.

As best seen in FIG. 2, the first cradle 206 may include a first concave surface 208 defining a first radius of curvature 210 and a first longitudinal axis 212, and a second cradle 214 including a second concave surface 216 defining a second radius of curvature 218 that is greater than the first radius of curvature 210. The second concave surface 216 may also define a second longitudinal axis 212 and may include a front portion 248 and a rear portion 250 disposed along the second longitudinal axis 220. The mounting bracket 202 may also include a projection 251 extending upwardly from the second concave surface 216 disposed proximate the rear portion 250 of the of the second concave surface 216.

Looking again at FIG. 1, an AC compressor 104 may contact or rest on the first cradle 206, and an alternator 106 may contact or rest on the second cradle 214. As best seen in FIG. 2, the engine assembly 100 may further comprise a left side attachment surface 226 that is flat and a right side attachment surface 228 that is flat and that is not parallel to the left side attachment surface 226. Returning to FIG. 1, the engine assembly 100 may further comprise and an oil filter assembly 108 that is attached to the left side attachment surface 226 and fuel filter assembly 110 attached to the right side attachment surface 228.

As best understood by looking at FIGS. 1 and 2 together, the engine assembly 100 may further comprise a first plurality of idler wheels 112 (a belt 114 may be routed about the idler wheels 112 and other portions of the AC compressor 104, alternator 106, crankshaft pulley 116, etc.). Each of the first plurality of idler wheels 112 may be attached to one of the first plurality of mounting bosses 230. At least one 230' of the first plurality mounting bosses 230 may be disposed adjacent and below the second cradle 214.

The mounting bracket 202 may include a bottom portion 240 and at least three 230''' of the first plurality of the mounting bosses 230 may be disposed adjacent the bottom portion 240 of the mounting bracket 202. One of the three mounting bosses 230''' is a middle mounting boss 252 being disposed between two of the other mounting bosses 230 (may also be larger) that are disposed adjacent the bottom portion 240 of the mounting bracket. The engine assembly 100 may further comprise an auto-tensioner assembly 118 attached to middle mounting boss 252.

The mounting bracket 202 may define a plurality of core out cavities 254 that reduce the weight of the mounting bracket 202 and create a consistent nominal wall thickness, which may help to reduce the likelihood of voids or porosity from developing during a casting process used to manufacture the mounting bracket 202. The mounting bracket 202 may also include a first top attachment surface 256 disposed proximate the left side attachment surface 228. A first attachment bracket 120 may be attached to the first top attachment surface for holding onto water lines 122. Similarly, and a second top attachment surface 258 may be disposed proximate the right side attachment surface 228 and a second attachment bracket 124 may be provided to hold onto ATAAC lines (not shown but represented by dotted lines 138).

The engine assembly 100 may further comprise an outer annular wall 242 including a cylindrical configuration and an inner annular wall 244 including a substantially triangular configuration. The inner annular wall 244 may be offset inwardly from the outer annular wall 242 while the outer annular wall 242 may be disposed below the first cradle 206 and the second cradle 214. Also, a fuel pump assembly 126 may be provided that extends down into the engine assembly 100 and may be in communication with a central aperture 128 that partially defines the inner annular wall 244 (see FIG. 2). A fuel pump cover 130 may be attached to the inner annular wall 244 covering up the central aperture 128 (see FIG. 1).

Various other lubrication lines 132, exhaust lines 134, and a wiring harness 136 are also shown in FIG. 1 that supply fluid transportation and communication for various systems of the engine assembly 100. Dotted lines 138 depict the ATAAC lines while solid lines 140 depict a high temperature zone, indicating that mounting the alternator above and away from this zone may help increase the life of the alternator or may otherwise help the alternator to function properly.

INDUSTRIAL APPLICABILITY

In practice, a mounting bracket, an engine assembly, or a machine or vehicle using a mounting bracket or an engine assembly according to any embodiment described herein may be sold, bought, manufactured or otherwise obtained in an OEM or after-market context. Better serviceability, reliability, and/or durability for the mounting bracket, engine assembly, or a machine or vehicle using the same may be provided.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A mounting structure for an engine assembly, the mounting structure comprising:
    a mounting bracket comprising a single unitary sheet of material, the mounting bracket including a top portion including
        a first cradle including a first concave surface defining a first radius of curvature and a first longitudinal axis;
        a second cradle including a second concave surface defining a second radius of curvature that is different than the first radius of curvature, the second concave surface also defining a second longitudinal axis that is parallel to the first longitudinal axis;
        a first pair of mounting surfaces straddling either side of the first cradle; and
        a second pair of mounting surfaces straddling either side of the second cradle.

2. The mounting structure of claim 1 further comprising a left side attachment surface that is flat.

3. The mounting structure of claim 1 further comprising a first plurality of mounting bosses.

4. The mounting structure of claim 3 wherein each of the first plurality of mounting bosses defines an aperture that is configured to receive a fastener.

5. The mounting structure of claim 4 wherein at least one of the first plurality of mounting bosses is disposed adjacent and below the second cradle.

6. The mounting structure of claim 4 wherein the mounting bracket includes a bottom portion and at least two of the first plurality of mounting bosses are disposed adjacent the bottom portion of the mounting bracket.

7. The mounting structure of claim 2 further comprising a right side attachment surface that is flat.

8. The mounting structure of claim 7 wherein the left side attachment surface is not parallel to the right side attachment surface and the left side attachment surface is parallel to the first longitudinal axis of the first cradle and to the second longitudinal axis of the second cradle.

9. The mounting structure of claim 1 wherein the material is aluminum.

10. The mounting structure of claim 3 further comprising an outer annular wall including a cylindrical configuration with a circumferential direction, and an inner annular wall including a substantially triangular wall, the inner annular wall being offset inwardly from the outer annular wall and the outer annular wall being disposed below the first cradle and the second cradle, the outer annular wall further comprising a second plurality of mounting bosses forming a circular array disposed circumferentially on the outer annular wall.

11. An engine assembly comprising:
    an engine block;
    a mounting structure including:
        a mounting bracket comprising a single unitary sheet of material; and the mounting bracket including a top portion including
        a first cradle including a first concave surface defining a first radius of curvature and a first longitudinal axis;
        a second cradle including a second concave surface defining a second radius of curvature that is greater than the first radius of curvature, the second concave surface also defining a second longitudinal axis and including a front portion and a rear portion disposed along the second longitudinal axis, the mounting bracket also including a projection extending upwardly from the second concave surface disposed proximate the rear portion of the of the second concave surface;
    an AC compressor contacting the first cradle; and
    an alternator contacting the second cradle.

12. The engine assembly of claim 11 further comprising a left side attachment surface that is flat and an oil filter assembly attached to the left side attachment surface.

13. The engine assembly of claim 11 further comprising a first plurality of mounting bosses and each of the first plurality of mounting bosses defines an aperture that is configured to receive a fastener, the engine assembly further comprising a first plurality of idler wheels, each of the first plurality of idler wheels being attached to the one of the first plurality of mounting bosses.

14. The engine assembly of claim 13 wherein at least one of the first plurality mounting bosses is disposed adjacent and below the second cradle.

15. The engine assembly of claim 14 wherein the mounting bracket includes a bottom portion and at least three of the first plurality of the mounting bosses are disposed adjacent the bottom portion of the mounting bracket, one of the three mounting bosses is a middle mounting boss being disposed between two of the other mounting bosses that are disposed adjacent the bottom portion of the mounting bracket, and the engine assembly further comprises an auto-tensioner assembly attached to middle mounting boss.

16. The engine assembly of claim 12 further comprising a right side attachment surface that is flat.

17. The engine assembly of claim 16 wherein the left side attachment surface is not parallel to the right side attachment surface, the engine assembly further comprising a fuel filter assembly attached to the right side attachment surface.

18. The engine assembly of claim 11 wherein the mounting bracket defines a plurality of core out cavities and includes a first top attachment surface disposed proximate the left side attachment surface and a second top attachment surface disposed proximate the right side attachment surface.

19. The engine assembly of claim 11 further comprising an outer annular wall including a cylindrical configuration and an inner annular wall including a substantially triangular configuration, the inner annular wall being offset inwardly from the outer annular wall and the outer annular wall being disposed below the first cradle and the second cradle.

20. The engine assembly of claim 19 further comprising a fuel pump cover attached to the inner annular wall.

* * * * *